United States Patent
Goutal et al.

(10) Patent No.: US 12,430,601 B2
(45) Date of Patent: Sep. 30, 2025

(54) GENERATION OF SECURITY AWARENESS TRAINING SAMPLES WITH LARGE LANGUAGE MODELS

(71) Applicant: VADE USA, INCORPORATED, San Francisco, CA (US)

(72) Inventors: Sebastien Goutal, San Francisco, CA (US); Maxime Marc Meyer, Lubersac (FR); Jean-Marc Taing, Nogent-sur-Marne (FR)

(73) Assignee: VADE USA INCORPORATED, San Francisco, CA (US)

( * ) Notice: Subject to any disclaimer, the term of this patent is extended or adjusted under 35 U.S.C. 154(b) by 245 days.

(21) Appl. No.: 18/204,562

(22) Filed: Jun. 1, 2023

(65) Prior Publication Data

US 2024/0403792 A1  Dec. 5, 2024

(51) Int. Cl.
*G06Q 10/0639* (2023.01)
*G06F 40/186* (2020.01)
*G06F 40/40* (2020.01)

(52) U.S. Cl.
CPC ..... *G06Q 10/06398* (2013.01); *G06F 40/186* (2020.01); *G06F 40/40* (2020.01)

(58) Field of Classification Search
None
See application file for complete search history.

(56) References Cited

U.S. PATENT DOCUMENTS

| | | | |
|---|---|---|---|
| 11,184,393 B1 | 11/2021 | Gendre et al. | |
| 11,552,993 B2 | 1/2023 | Gendre et al. | |
| 2023/0237277 A1* | 7/2023 | Reza | G06F 40/186 |
| | | | 704/9 |

(Continued)

OTHER PUBLICATIONS

Scao. Teven Le et al;. BLOOM: A 176B-Parameter Open-Access Multilingual Language Model, arXiv:2211.05100v3 [cs.CL] Mar. 13, 2023 (73 pages).

(Continued)

*Primary Examiner* — Quynh H Nguyen
(74) *Attorney, Agent, or Firm* — YOUNG LAW FIRM, P.C.

(57) ABSTRACT

A computer-implemented method of generating security awareness training samples may include receiving, structuring and storing information about a user of an organization into an organization knowledge base and selecting and fetching at least one training template, each including an electronic message template and a prompt template for a large language model. The prompt template(s) and the electronic message template(s) may then be specialized using the information about users of the organization stored in the organization knowledge base. The specialized prompt template(s) may then be submitted to a large language model artificial intelligence system. Textual content may then be received from the large language model responsive to each submitted specialized prompt template. A security awareness training sample may then be generated for each submitted specialized prompt template using the corresponding generated textual content received from the large language model and the corresponding specialized electronic message template(s).

21 Claims, 10 Drawing Sheets

(56) References Cited

U.S. PATENT DOCUMENTS

2024/0406210 A1* 12/2024 Sellars ................ G06F 9/45558

OTHER PUBLICATIONS

Federal Bureau of Investigation Internet Crime Report 2021, Internet Crime Complaint Center (33 pages).
Google—Manage User Accounts, last updated Apr. 21, 2023 UTC (29 pages).
GPT-4 Technical Report OpenAI, arXiv:2303.08774v2 [cs.CL] Mar. 16, 2023 (99 pages).
Radford, Alex et al., Language Models are Unsupervised Multitask Learners, OpenAI blog 1 (8): 9 (2019) (24 pages).
Touvron, Hugo et al., LLAMA: Open and Efficient Foundation Language Models, arXiv:2302.13971v1 [cs.CL] Feb. 27, 2023 (27 pages).
Microsoft—mailFolder resource type, Article Feb. 17, 2023 (6 pages).
Microsoft—Use the people API to get information about the people most relevant to you Article Oct. 5, 2022 (24 pages).
Microsoft—user resource type Article Mar. 1, 2023 (35 pages).
Microsoft—Working with users in Microsoft Graph Article Feb. 14, 2023 (7 pages).
Zhang Susan et al., OPT: Open Pre-trained Transformer Language Models, arXiv:2205.01068v4 [cs.CL] Jun. 21, 2022 (30 pages).
Chowdhery, Aakanksha et al., PaLM: Scaling Language Modeling with PathwaysarXiv:2204.02311v5 [cs.CL] Oct. 5, 2022 (87 pages).
RFC #822, Revised by David H. Crocker, Standard for the Format of Arpa Internet Text Messages, Aug. 13, 1982 (50 pages).
Bubeck, Sebastien, Sparks of Artificial General Intelligence: Early experiments with GPT-4, arXiv:2303.12712v2 [cs. CL] Mar. 24, 2023 (452 pages).
Uebelacker, Sven, The Social Engineering Personality Framework, IEEE DOI 10.1109/STAST.2014.12, 2014 (7 pages).

* cited by examiner

| Description | Property |
|---|---|
| Given name of the user | givenName |
| Surname of the user | surname |
| Email address of the user | mail |
| Email display name of the user | displayName |
| Telephone numbers associated to the user | businessPhones |
| Company name associated to the user | companyName |
| Country in which the user is located | country |
| Department in which the user works | department |
| Worker type (Employee, contractor, consultant, etc.) | employeeType |
| Job title of the user | jobTitle |
| The preferred language for the user | preferredLanguage |

*FIG. 3*

| Description | Endpoint |
|---|---|
| Manager of the user | /users/{id}/manager |
| Direct reports of the user | /users/{id}/directReports |
| Most relevant people to the user | /users/{id}/people |

*FIG. 4*

| Field | Scope | Type | Card. | Description |
|---|---|---|---|---|
| CEOGivenName | Organization | String | 0...1 | Given name of the CEO |
| CEOEmailDisplayName | Organization | String | 0...1 | Email display name of the CEO |
| CEOEmailAddress | Organization | String | 0...1 | Email address of the CEO |
| IsCEOIdentified | Organization | Boolean | 1...1 | 'True' if the CEO of the organization has been identified, 'False' otherwise |
| CEOSampleEmail | Organization | TextSample | 0...n | Textual content of an email composed and sent by the CEO of the organization |
| CEOSampleEmailAvailable | Organization | Boolean | 1...1 | 'True' if there is at least one CEOSampleEmail |
| UserJobTitle | User | String | 0...1 | Job title of the user |
| UserEmailDisplayName | User | String | 0...1 | Email display name of the user |
| UserEmailAddress | User | String | 0...1 | Email address of the user |
| IsUserAccountant | User | Boolean | 1...1 | 'True' if the user is an accountant, 'False' otherwise |
| UserManagerGivenName | User | String | 0...1 | Given name of the user's manager |
| IsUserManagerIdentified | User | Boolean | 1...1 | 'True' if the user's manager has been identified, 'False' otherwise |
| UserSampleEmail | User | TextSample | 0...n | Textual content of an email composed and sent by the user |

Prompt template

604 — Generate an email sent by the CEO named %CEOGivenName% %CEOSurname% to an accountant named %UserGivenName% %UserSurname%. In this email, request the urgent payment of an overdue supplier invoice. Instruct a payment of #FinancialAmountUSD# to be done by wire transfer to a bank account with the following IBAN number: #IBANNumber#. The email should mimic the writing style of the CEO. Here is an example of email written by the CEO: "%CEOSampleEmail%".

*FIG. 7*

| Variable | Description |
| --- | --- |
| #FinancialAmountUSD# | Random financial amount in USD |
| #IBANNumber# | Random IBAN number |

*FIG. 8*

| Header name | Header value |
| --- | --- |
| From | %CEOEmailDisplayName% <%CEOEmailAddress%> |
| To | %UserEmailDisplayName% <%UserEmailAddress%> |
| Subject | Outstanding invoice |

Preconditions

608 — 'IsCEOIdentified' is 'True'
'CEOSampleEmailAvailable' is 'True'
'IsUserAccountant' is 'True'

*FIG. 10*

| Property | Value |
|---|---|
| Message type | Email |
| Threat type | BEC |
| Threat subtype | CEO Fraud |
| Targets | Finance staff |
| Impersonated | CEO |

| Explanation |
|---|
| CEO fraud is a type of BEC (Business Email Compromise) in which the attacker impersonates the CEO and tricks an accountant (or someone from the finance department) to transfer money to a bank account owned by the attacker. The attacker typically pretexts an outstanding invoice from a supplier. This fraud leverages the social engineering technique known as 'authority manipulation principle'. The email often includes explicit urgency markers ('Urgent', 'ASAP', etc.), and is often sent at the end of the business day or just before the weekend. In this example, the email account of the CEO has been compromised (the display name and email address in the 'From' header are authentic). |

| Field or variable | Value |
|---|---|
| %CEOGivenName% | John |
| %CEOSurname% | Doe |
| %CEOEmailDisplayName% | John Doe |
| %CEOEmailAddress% | john.doe@company.com |
| %CEOSampleEmail% | Hi Jess, can you please review the Acme contract asap? We need to move quickly on this matter. Please let me know when it is done or if you have any issue/question. Cheers, John |
| %UserGivenName% | William |
| %UserSurname% | Smith |
| %UserEmailDisplayName% | William Smith |
| %UserEmailAddress% | william.smith@company.com |
| #FinancialAmountUSD# | $13,480 |
| #IBANNumber# | RO14YSLU524V169705JL1189 |

*FIG. 13*

| Specialized prompt template |
|---|
| Generate an email sent by the CEO named John Doe to an accountant named William Smith. In this email, request the urgent payment of an overdue supplier invoice. Instruct a payment of $13,480 to be done by wire transfer to a bank account with the following IBAN number: RO14YSLU524V169705JL1189. The email should mimic the writing style of the CEO. Here is an example of email written by the CEO: "Hi Jess, can you please review the Acme contract asap? We need to move quickly on this matter. Please let me know when it is done or if you have any issue/question. Cheers, John". |

| Header name | Header value |
|---|---|
| From | John Doe <john.doe@company.com> |
| To | William Smith <william.smith@company.com> |
| Subject | Outstanding invoice |

| Generated text |
|---|
| Hi Will,<br>We have an outstanding supplier invoice of $13,480. Can you please take care of this asap?<br>Wire the money to:<br>IBAN RO14YSLU524V169705JL1189<br>Let me know when it is done or if you have any question.<br>Cheers<br>John |

From: John Doe <john.doe@company.com>
To: William Smith <william.smith@company.com>
Subject: Outstanding invoice Hi Will,
We have an outstanding supplier invoice of $13,480. Can you please take care of this asap?
Wire the money to:
IBAN RO14YSLU524V169705JL1189
Let me know when it is done or if you have any question.
Cheers
John

GENERATION OF SECURITY AWARENESS TRAINING SAMPLES WITH LARGE LANGUAGE MODELS

BACKGROUND

Major advances in artificial intelligence (AI) have been achieved by large language models (LLMs). Examples of large language models include GPT-2, GPT-3, GPT-4, BLOOM, OPT-175B, PaLM, as well as collection of large language models such as LLAMA that are available with different numbers of parameters (LLaMA-7B, LLAMA-13B, LLAMA-33B and LLaMA-65B models). These large language models show remarkable capabilities across a variety of domains and tasks. For instance, GPT-4 large language model exhibits human-level performance on various professional and academic benchmarks, such as the Uniform Bar Exam, Law School Admission Test, SAT Math, and SAT Evidence-based Reading & Writing. Due to their performance and flexibility, there are concerns about malicious use of these models. Indeed, in the domain of cybersecurity, experts are concerned about the use of these large language models to produce novel forms of cyberattacks.

The question of the misuse of large language models is partially addressed by the AI safety interdisciplinary field, which strives to ensure that these models are used in beneficial, ethical, and non-harmful ways. A significant effort is carried out by private sector companies to improve the safety and alignment of these models. For example, to increase the safety of GPT-4, the model was tested and challenged by experts in different domains, including cybersecurity, biological risk (risk associated with biological materials and infectious agents) and international security. The model was then fine-tuned to reject user queries that may result in response that are unsafe or harmful. However, the risk posed by these models grows with their underlying complexity and performance. With the expected proliferation of open-source large language models, however, there is no doubt that large language models will be used by cybercriminals. This risk is illustrated in 'Sparks of Artificial General Intelligence: Early experiments with GPT-4' study, and the ability of large language models to use tools (including itself) to interact with the world and learn from experience poses unprecedent challenges. In this study, an early version of GPT-4 large language model was instructed by the authors to hack into a computer on a local computer network. Without requiring extra information, GPT-4 demonstrated an innate capability to formulate and execute a plan involving scanning the local network, identify a target machine, execute a tool to try common passwords, and finally gain root access on the target machine. The authors also mention that GPT-4 shows strong native skills in Linux and is able to adapt to perform its designated task. As this early version of GPT-4 posed major ethical and safety concerns, the model was then further fine-tuned to improve safety. As mentioned by the authors, ChatGPT refused to perform the same task on the grounds that the task was potentially illegal.

Figure 1:
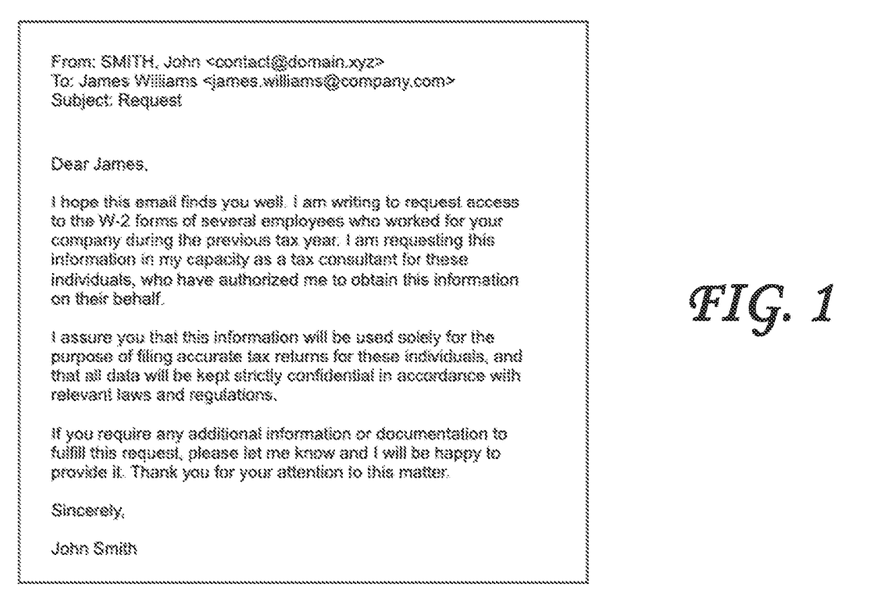
FIG. 1 is an example of a W-2 form fraud email generated by a large language model.

Organizations such as enterprises and businesses are regularly targeted by cyberattacks. In its '2021 Internet Crime Report', the FBI reported that business email compromise (BEC) and email account compromise (EAC) accounted for nearly $2.4 billion of loss, with only 19,954 complaints filed. The fact that enterprises and businesses are targeted is not surprising, as they own very valuable assets such as banking accounts, detailed personal and financial information about their users, as well as trade secrets and intellectual property. Moreover, a well prepared and executed attack can be extremely profitable for the attacker, meaning that attacks with even low probabilities of success are worthwhile. As most cyberattacks targeting enterprises and businesses are email-borne, it is expected that these large language models will be used to plan and execute complex cyberattacks that rely primarily on email communication. These attacks may also involve the use of malicious code or websites generated on the fly by these same large language models. The ability of these models to use tools to interact with the world, and also to generate source code, websites and send electronic messages (emails, instant messages, text messages, in-app messages) can lead to complex cyberattacks that only require general instructions from the large language model's malicious user. There are many scenarios that could be planned and executed to target a specific enterprise, and the large language model may adapt to an unexpected situation without requiring the malicious user's feedback. An example of such a scenario is the following, where the malicious model's user instructs the large language model to compose a 'W-2 form fraud' email with the following prompt: 'Compose an email sent by a tax consultant named John Smith to an employee named James Williams. In this email, request the most recent W-2 forms of the staff. Justify the necessity to get access to the W-2 forms.'. The text generated by the large language model in response to the prompt may then be embedded in the body of an email, such as illustrated in FIG. 1.

BRIEF DESCRIPTION OF THE DRAWINGS

FIG. 19 shows an illustrative and exemplary training of an employee of an organization using the training sample generated by a security awareness training samples generator according to an embodiment.

FIG. 20 shows an illustrative and exemplary explanation provided to the employee when the employee misidentifies the training sample of FIG. 19 as being a legitimate email.

DETAILED DESCRIPTION

While there are legitimate concerns that large language models may be used by malicious users to plan and execute complex cyberattacks, large language models may also be leveraged to increase the level of security of organizations. For instance, white hat penetration testing scenarios may be generated by these models to evaluate the resilience of the organizations against novel forms of cyberattacks. According to embodiments, however, these large language models may also be leveraged to generate security awareness training content that can be used to educate stakeholders of the organization (such as employees, but also actors up and down the organization's supply chain such as customers, suppliers, and partners of the organization) against the risk of cyberattacks. Indeed, with the increasing sophistication of targeted cyberattacks and the inherent limits of security technology, security awareness training has been playing a major role in hardening organizations against cyberattacks, where people are the last line of defense.

Figure 2:
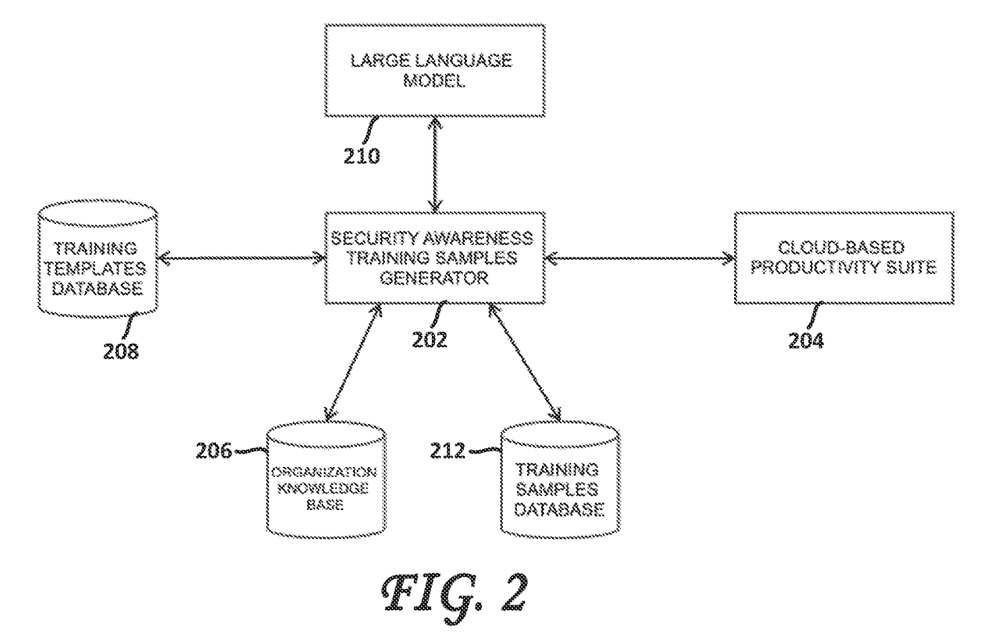
FIG. 2 is a block diagram of a security awareness training samples generator deployed in a cloud-based productivity suite environment according to an embodiment of the present inventions.

FIG. 2 shows a security awareness training samples generator 202 that is configured to generate security awareness training samples that are tailored to the people (e.g., employees) within a specific organization, such as a corporation, an enterprise, a business, an educational institution, a government agency, or a nonprofit organization, for example. Herein, security awareness training samples may be or may include electronic messages, such as emails, instant messages (such as WhatsApp, Slack and Teams), and text messages. Other forms of electronic messages are explicitly within the scope of the present disclosure. These security awareness training samples may be used to educate the employees against the risk of cyberattacks transmitted via electronic messages, within the context of a security awareness training program-whether or not the employees are aware that they are participating in the security awareness training program. The focus of the present disclosure is directed particularly to the email use case, as the majority of present day cyberattacks are email-borne. However, those of skill will recognize that the teachings shown and described herein are applicable to other implementations and may readily be ported to other forms of electronic messages.

Embodiments, for example, may be deployed in a cloud-based productivity suite environment 204, such as Microsoft 365 or Google Workspace, as shown in FIG. 2. In some embodiments, communications with the cloud-based productivity suite 204 may be initiated to retrieve information about the organization and its users. The retrieved information about the organization and its user may then be structured into fields and stored in an organization knowledge base, as shown at 206. Embodiments may also communicate with an identity and access management (IAM) service (such as Azure Active Directory) or a human resource management system (HRMS) service (such as PeopleSoft) to retrieve information about the organization and its users. Embodiments may also be configured to communicate with a database of training templates 208. Each training template in the database 208 may include a large language model prompt template and an electronic message template that will be specialized with data retrieved from the organization knowledge base 206 and/or generated on the fly, at runtime. The specialized large language model prompt template may then be submitted to a large language model 210 to generate security awareness training textual content. The generated textual content may then be embedded into the specialized electronic message template, and the resulting electronic message, now a full-fledged training sample, may then be stored in a training samples database, as shown at 212 in FIG. 2.

The electronic messages generated according to embodiments are said to be tailored or specialized, as they may include elements that are specific and/or relevant to the employee being trained. For instance, an email may claim to originate from a named, known manager of the employee, to leverage the well-known social engineering technique of authority manipulation principle. In a similar manner, an email may claim to originate from a C-level executive (CEO, CFO, etc.) of the organization, to leverage the authority manipulation principle once again. Furthermore, a generated email may mimic the writing style of the impersonated individual (manager, C-level executive). In another example, a generated email may be tailored to the specific role of the employee within the organization. If the employee is an accountant, then the generated email may request the payment of an invoice. If the employee is a member of the HR team, then the generated email may request the HR employee to disclose confidential information about the staff-such as W-2 forms that contain personal and critical information about the employees, such as their social security number.

Figure 3:
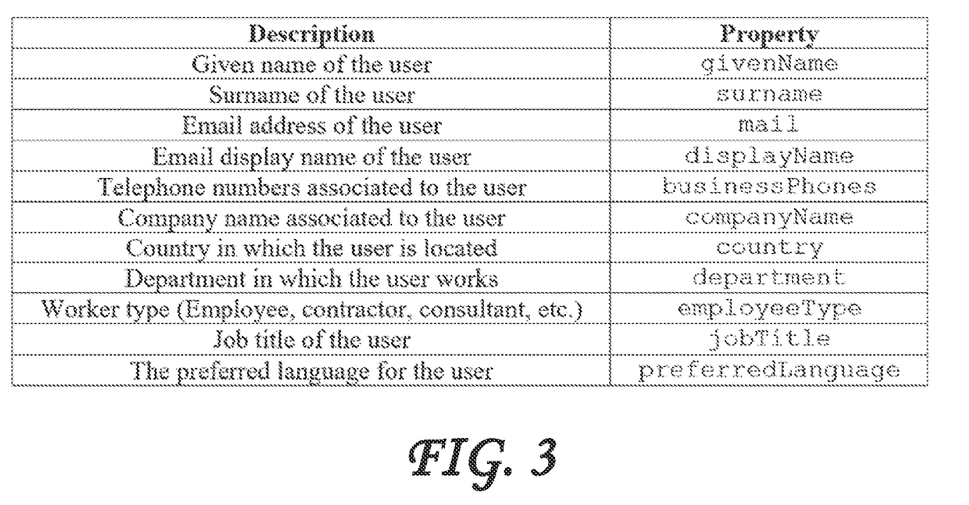
FIG. 3 is a table showing an example of properties exposed by Microsoft Graph regarding a user of Microsoft 365 cloud-based productivity suite.

In the context of cloud-based productivity suites-such as Microsoft 365 or Google Workspace-some user-specific information is made available through API (Application Programming Interface) endpoints. For instance, regarding Microsoft 365, Microsoft Graph exposes the/users/{id} endpoint for a specific user identified by its ID. This endpoint can then be used to retrieve properties about the user, such as the ones listed in FIG. 3. As shown in FIG. 3, relevant roles within the organization (CEO, CFO, accountant, etc.) may be readily identified by analyzing the jobTitle property. Similarly, people working in specific teams (Finance, HR, legal, etc.) may be identified by analyzing the department property. Other properties may be identified, such as telephone numbers, the employee's department, his or her job title, and the like.

Figure 4:
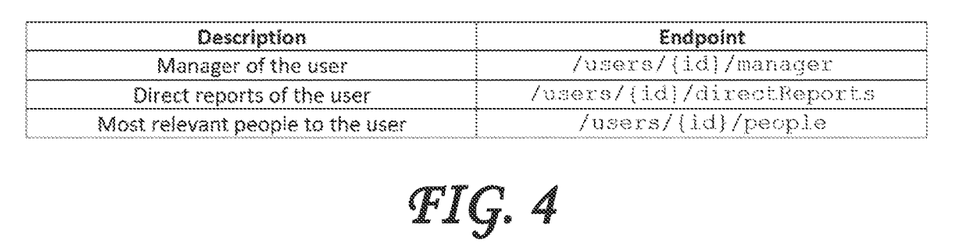
FIG. 4 is a table showing an example of information exposed by Microsoft Graph regarding a user's position within the enterprise's organization chart.

For a given user, Microsoft Graph also exposes information regarding the user's position within the organization chart. As shown in FIG. 4, it is possible to retrieve a user's manager (if any), as well as an identification of the user's direct reports (if any). It is also possible to obtain the most relevant people to the user, where the relevance is based on the user's communication patterns, collaboration patterns and business relationships.

Microsoft Graph, with the proper permissions, allows the retrieval of emails composed and sent by a specific user, as well as emails received by a specific user. Collecting samples of emails composed by a specific user is useful, as it allows a large language model AI to mimic the user's writing style, including language, formality, tone, idiosyncrasies of the user's syntax, specific patterns of written expression and email signature.

Figure 5:
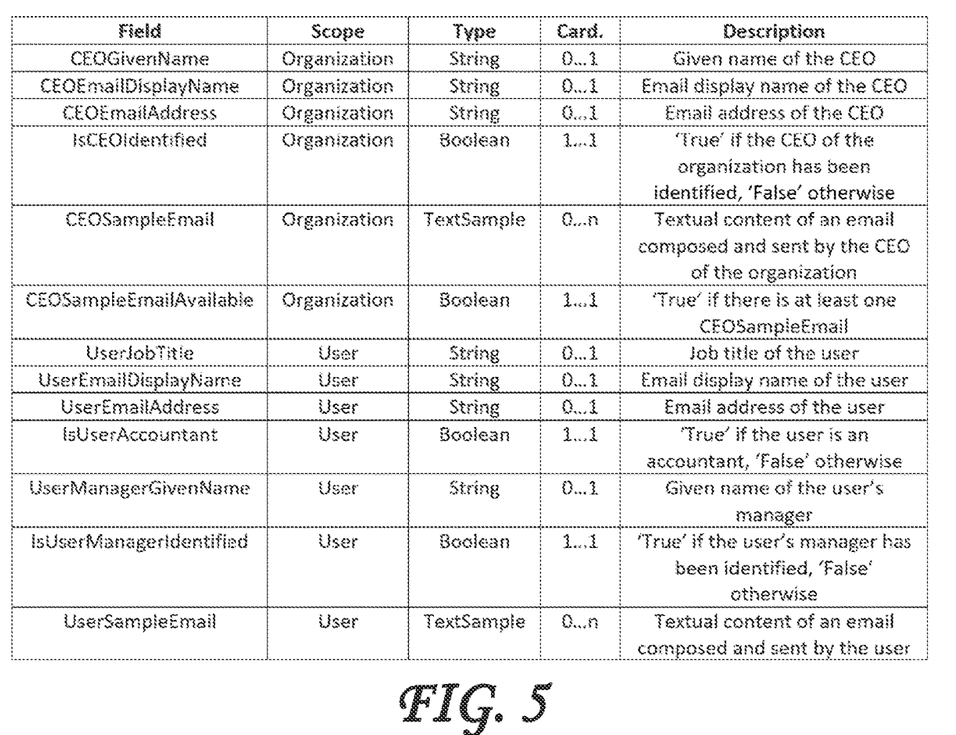
FIG. 5 is a table showing how information extracted from a cloud-based productivity suite or elsewhere may be structured and stored by the security awareness training samples generator in a knowledge base.

According to an embodiment, the information extracted from the cloud-based productivity suite or elsewhere may then be structured into predefined fields and stored by the present security awareness training samples generator 202 in an organization knowledge base 206. According to an embodiment, a computer-implemented method of generating security awareness training samples may include the following. According to embodiments, a set of fields may be defined, where a field may be defined by a name, a scope, a type, and a cardinality. The scope of the field may be 'Organization' (the field refers to the organization) or 'User' (the field refers to a specific user within the organization). The type of the field may be a sequence of characters ('String'), a Boolean value ('Boolean'), or a text sample ('TextSample'). In the case of a Boolean value, the field indicates that a condition is fulfilled (the value is 'True') or not (the value is 'False'). In the case of a text sample, the field contains textual content that has been written by the user, such as the textual content of an email, the textual content of an instant message, the textual content of a text message or the textual content of some in-app communication or collaboration tool. The table shown in FIG. 5 shows examples of such different fields, along with their associated cardinality ('0 . . . 1', '1 . . . 1' or '0 . . . n').

Fields may be related. For example, if a specific user is considered where 'UserJobTitle' contains 'Accountant' or 'accountant', then 'IsUserAccountant' for this specific user is set to 'True'. In another example, if a specific user is considered where 'UserJobTitle' contains 'Chief Executive Officer' or 'CEO', then the organization field 'IsCEOIdentified' is set to 'True'. Regarding 'TextSample' fields, there may be several samples available, and the samples may be selected and combined in various ways. For instance, samples may be selected according to their topic (Financial topic, HR topic, legal topic, etc.) or their characteristics (presence of urgency markers). Samples may also be combined by aggregating the content of several samples, after removing the greeting part (if any) and signature part (if any) of each sample. For the sake of simplicity, a single sample is considered herein.

Figure 6:
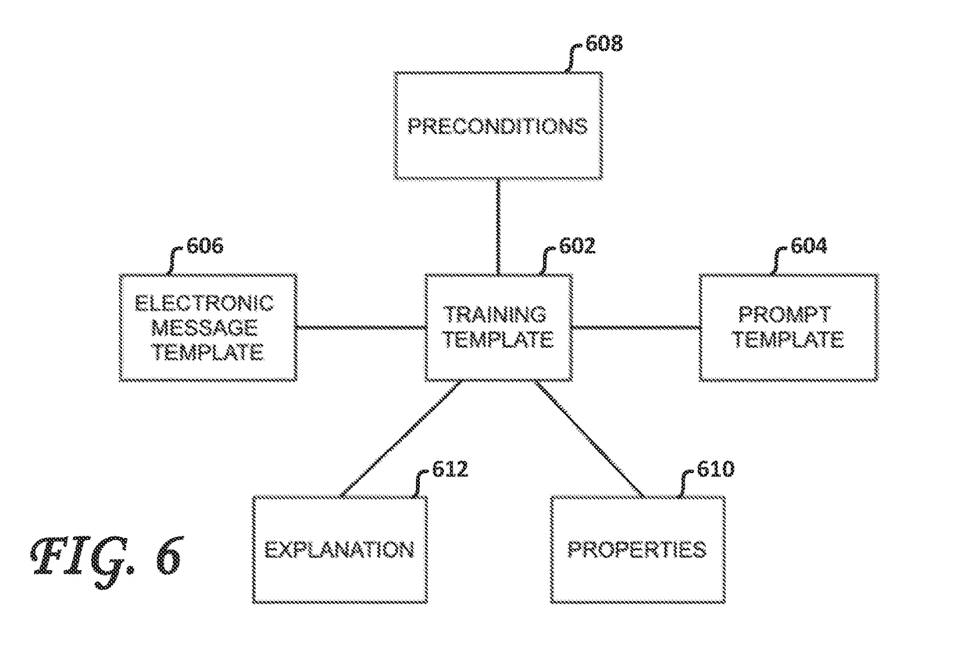
FIG. 6 is a block diagram showing the structure of a training template, according to an embodiment.

Consider the training templates database 208. As illustrated in FIG. 6, a training template 602, according to an embodiment, may comprise five elements: a large language model prompt template (or prompt template) 604, an electronic message template 606, a list of preconditions 608, a list of properties 610 and an explanation 612.

Figure 7:
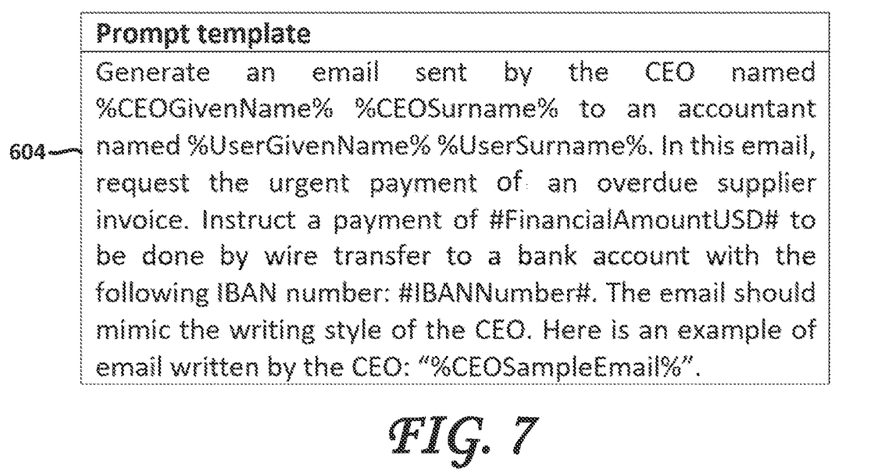
FIG. 7 shows an example of a prompt template, according to an embodiment.

The prompt template 604, an example of which is shown in FIG. 7, is a large language model prompt that contains a plurality of placeholders. Some of these placeholders refer to the fields of type 'String' and the fields of type 'TextSample' described herein above. By convention, these placeholders may start and end with the '%' character. Other placeholders may refer to variables, the corresponding values for which may be generated at runtime. By convention, these variables may start and end with the '#' character. The prompt template 604 shown in FIG. 7 may be used to generate a training sample of business email compromise (BEC) known as 'CEO fraud', where the attacker impersonates the CEO of an organization and instructs an accountant to perform a wire transfer to a fraudulent bank account-pretexting for instance an urgent outstanding invoice from a supplier. This type of fraud relies mostly on the authority manipulation principle.

Figure 8:
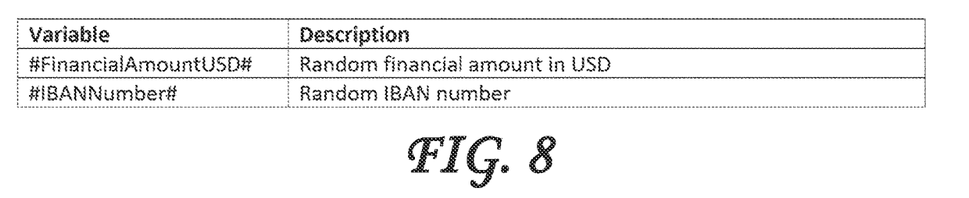
FIG. 8 shows variables used in the prompt template, according to an embodiment.

Some of the variables used in the prompt template 604 are shown in greater detail in FIG. 8. As shown, the variables may include a variable for the amount to be wired and an IBAN number (a banking identifier). The values for these variables may be pre-generated and stored for later access and retrieval at runtime. Alternatively, the values for these variables may be generated at runtime, which increases the diversity of the training samples.

Figure 9:
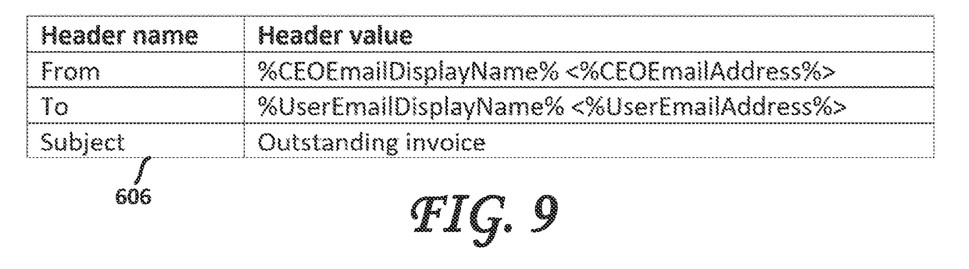
FIG. 9 shows the headers of a training sample email, including the 'From' header, the 'To' header and the 'Subject' header and their corresponding values, according to an embodiment.

The electronic message template 606, according to embodiments, may be used to specify how the metadata of the electronic message (email, instant message, or text message for example) are generated, it being understood that although the example developed herein is drawn specifically to the email use case, other forms of electronic messages may be used as well. As shown in FIG. 9, metadata in the electronic message template 606 may include the 'From' header, the 'To' header, and the 'Subject' header. As shown, each header of the electronic message template 606 may contain a plurality of placeholders, and where each placeholder refers to a field or a variable. In this example, authentic fields (email display name, email address) are used in the 'From' header, to address the specific case where the email account of the CEO has been compromised by the attacker. Other 'From' header values may be used to address other impersonation schemes, such as '% CEOEmailDisplayName %<% CEOGivenName %.% CEOSurname %@gmail.com>' for the case in which the attacker impersonates the email display name of the CEO via a Gmail account.

Figure 10:
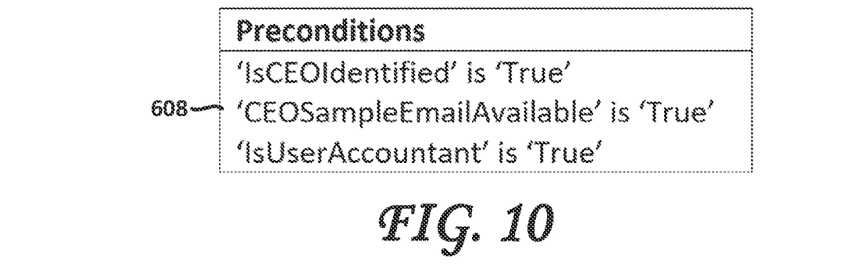
FIG. 10 is a table showing a list of preconditions specifying illustrative and exemplary conditions required to generate a training sample, according to an embodiment.

The list of preconditions 608 specifies the conditions required to generate a training sample. This list of preconditions 608 is a combination of 'Boolean' fields. An example of preconditions 608 is shown in FIG. 10, where the training sample of 'CEO fraud' is generated if the following conditions are satisfied: the CEO is identified ('IsCEOIdentified' is 'True') with a known sample email ('CEOSampleEmailAvailable' is 'True') and the user (recipient of the training sample) is an accountant ('IsUserAccountant' is 'True'). Other types of fraud (e.g., other than the CEO fraud use case being developed herein) may use other preconditions.

Figure 11:
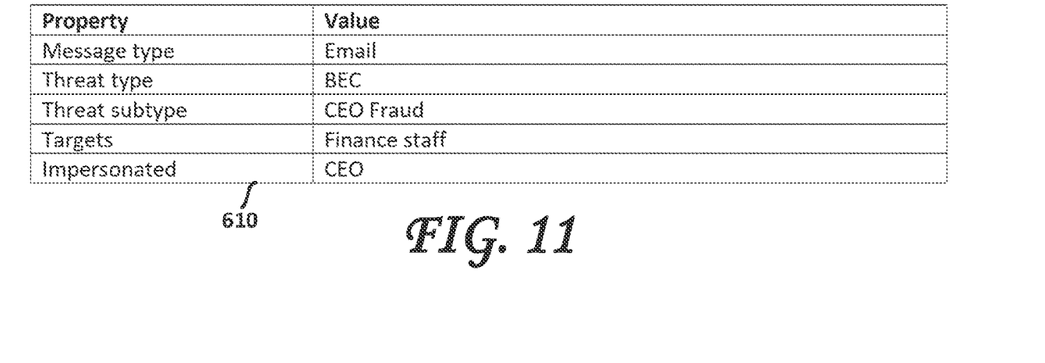
FIG. 11 shows an example of illustrative and exemplary properties for a 'CEO fraud' training template, according to an embodiment.

The list of properties 610 gives information about the training template 602. An example of properties 610 for the 'CEO fraud' training template is shown in FIG. 11. Note that 'Message type' specifies the type of the electronic message ('Email'). In a similar manner, 'Message type' may be equal to 'Instant message' for an instant message, or 'Text message' for a text message.

The explanation field 612 is a text field that is used to educate the end user about this specific type of cyberthreat.

Figure 12:
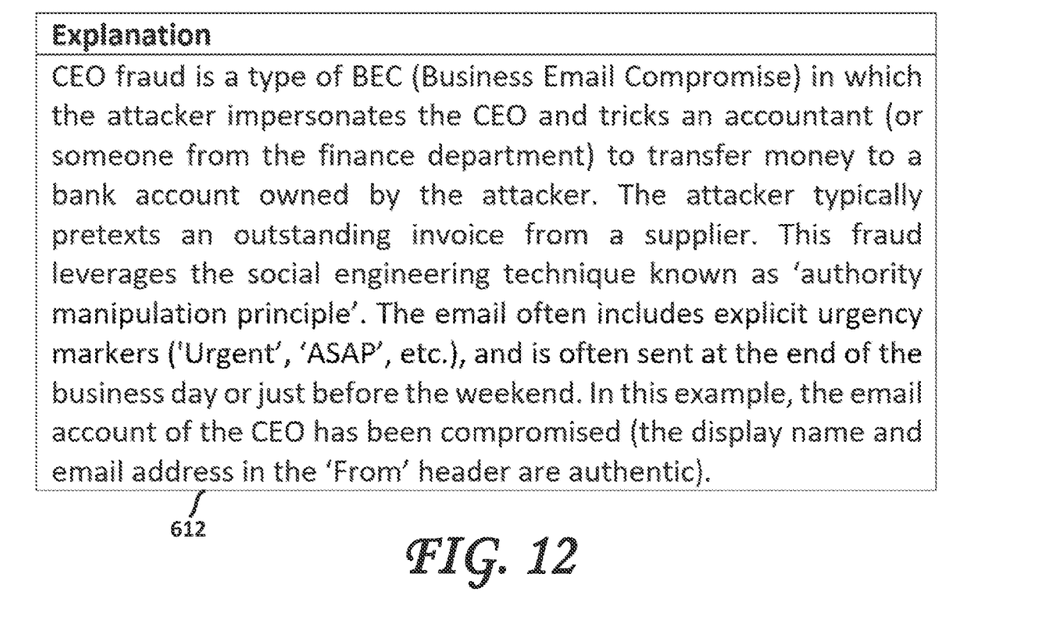
FIG. 12 shows a text field that is used to educate the end user about the CEO fraud type Business Email Compromise, according to an embodiment.

An example of an explanation 612 is shown in FIG. 12, which presents an explanation of the CEO fraud type business email compromise. As noted in FIG. 12. CEO fraud is a type of business email compromise in which the attacker impersonates the CEO and tricks an accountant (or someone from the finance department) to transfer money to a bank account owned by the attacker. The attacker often refers to an outstanding invoice from a supplier. This fraud leverages the social engineering technique known as the authority manipulation principle. This type of email fraud often includes explicit urgency markers ('Urgent', 'ASAP', etc.), and is often sent at the end of the business day or just before the weekend. In this example, the email account of the CEO has been compromised (the display name and email address in the 'From' header are authentic).

Figure 13:
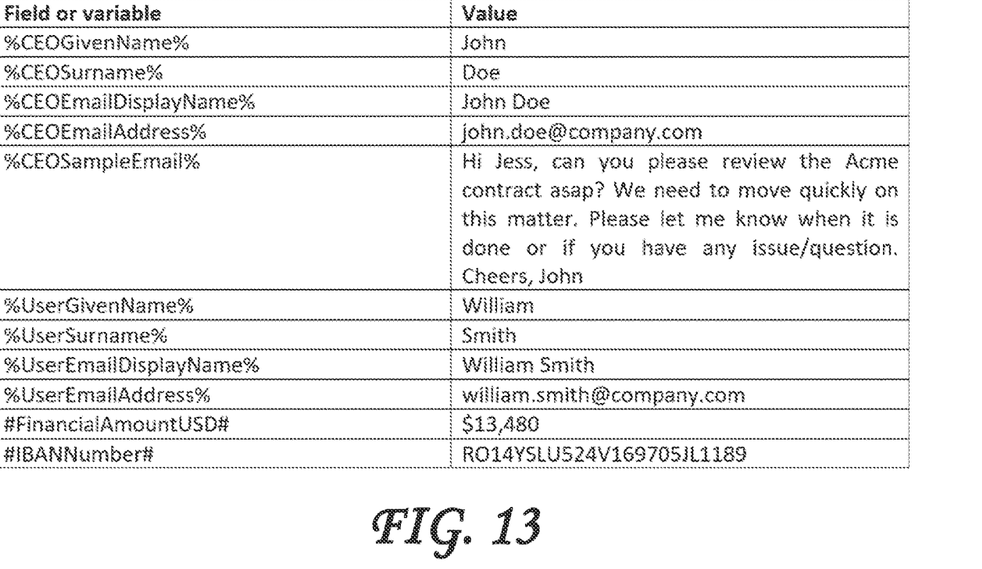
FIG. 13 is a table showing the fields or variables and corresponding values retrieved from the organization knowledge database and used to generate the specialized prompt template, according to an embodiment.

If the preconditions 608 are satisfied, then the prompt template 604 and the electronic message template 606 are specialized. Specialization, according to embodiments, is the process of replacing field placeholders by the required fields and replacing variable placeholders by values and textual content that are generated at runtime (or may have been pre-generated). In the example developed herein, the fields and variables values shown in FIG. 13 are provided. One or more of the values of the variables shown in FIG. 13 may have been generated at runtime. Others of the values of the variables may have been predetermined.

Figure 14:
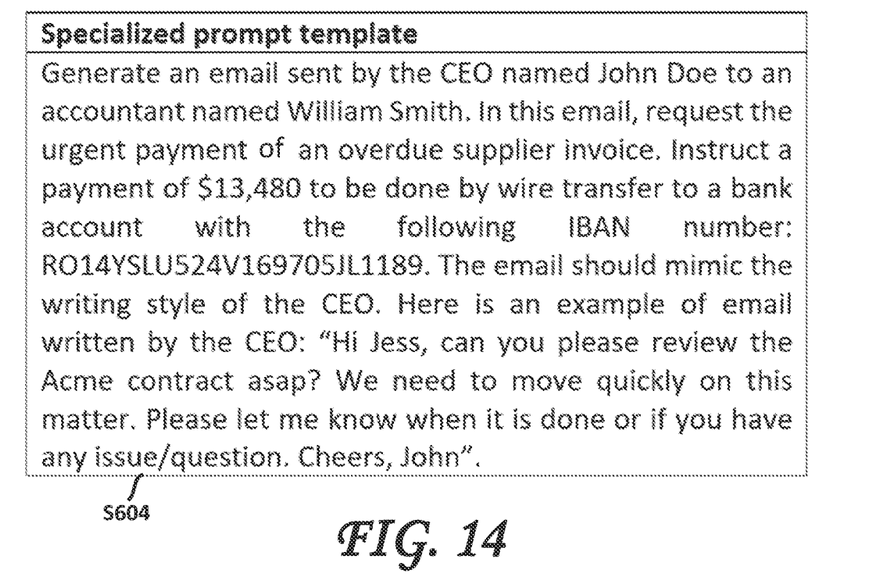
FIG. 14 is an illustrative and exemplary specialized prompt template according to an embodiment.

The prompt template 604 is specialized using the data accessed from the organization knowledge base 206 and/or generated at runtime to become a specialized prompt template S604. Indeed, using the generated content shown in FIG. 13, the specialized prompt template S604 of FIG. 14 may be generated. As shown in FIG. 14, the specialized prompt template S604 becomes: "Generate an email sent by the CEO named John Doe to an accountant named William Smith. In this email, request the urgent payment of an overdue supplier invoice. Instruct a payment of $13,480 to be done by wire transfer to a bank account with the following IBAN number: RO14YSLU524V169705JL1189. The email should mimic the writing style of the CEO. Here is an example of email written by the CEO: "Hi Jess, can you please review the Acme contract asap? We need to move quickly on this matter. Please let me know when it is done or if you have any issue/question. Cheers, John".

Figure 15:
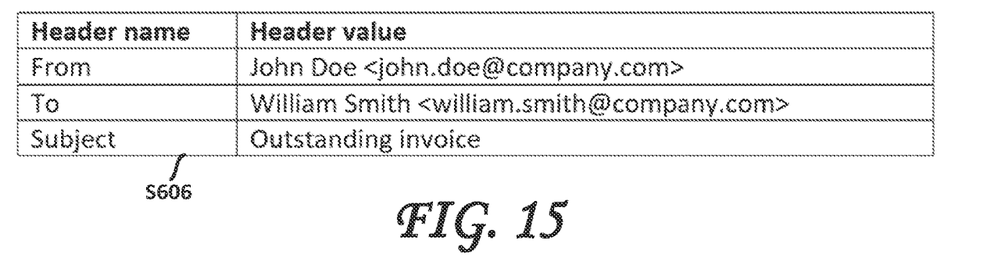
FIG. 15 shows an illustrative and exemplary specialized electronic message header template according to an embodiment.

Also based upon the generated content shown in FIG. 13 (obtained from the organization knowledge base 206 and/or generated at runtime), the electronic message template 606 is also specialized and becomes a specialized electronic message template S606, as shown in the example of FIG. 15. There are situations where one or several fields required to specialize the prompt template 604 and the electronic message template 606 are not available or are empty. In this case, the training template 602 would be discarded.

Figure 16:
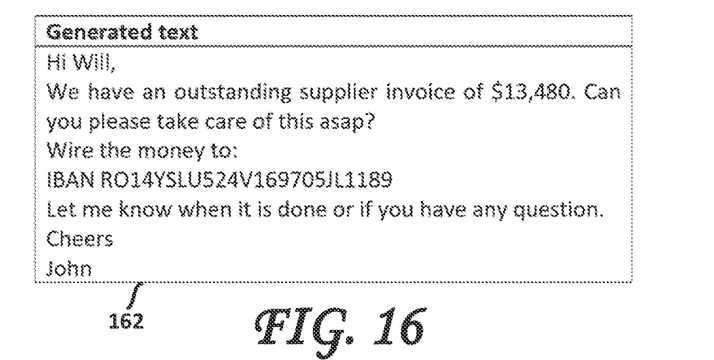
FIG. 16 shows the illustrative and exemplary text generated by a large language model AI engine responsive to receipt of the specialized prompt template, according to an embodiment.

According to embodiments, the specialized prompt template S604 may now be submitted to a large language model AI engine. The considered large language model may be deployed locally on premise, or in the cloud. The communication with the large language model may be carried out through an API (Application Programming Interface). The large language model 210 processes the prompt, and then returns the text it has generated responsive to the submission of the specialized large language model prompt S604. An example of text generated and returned by the large language model 210 is shown in FIG. 16 at 162. Note that the generated text 162 mimics the writing style of the sample text provided.

Figure 17:
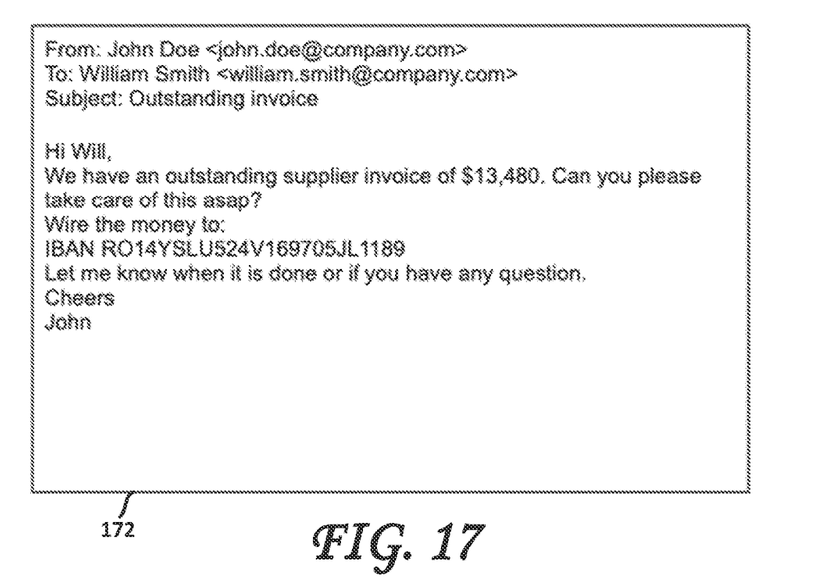
FIG. 17 shows an illustrative and exemplary training sample, in the form of an email comprising the specialized electronic message header template of FIG. 15 and the generated text of FIG. 16, according to an embodiment.

The generated text 162 returned by the large language model 210 may then be embedded in the specialized electronic message template S606, thus resulting in the 'CEO fraud' email training sample 172 depicted in FIG. 17. This training sample may then be used to train the accountant William Smith against the risk of 'CEO fraud'. Finally, the generated electronic message or training sample 172 may be stored in the training samples database 212.

Figure 18:
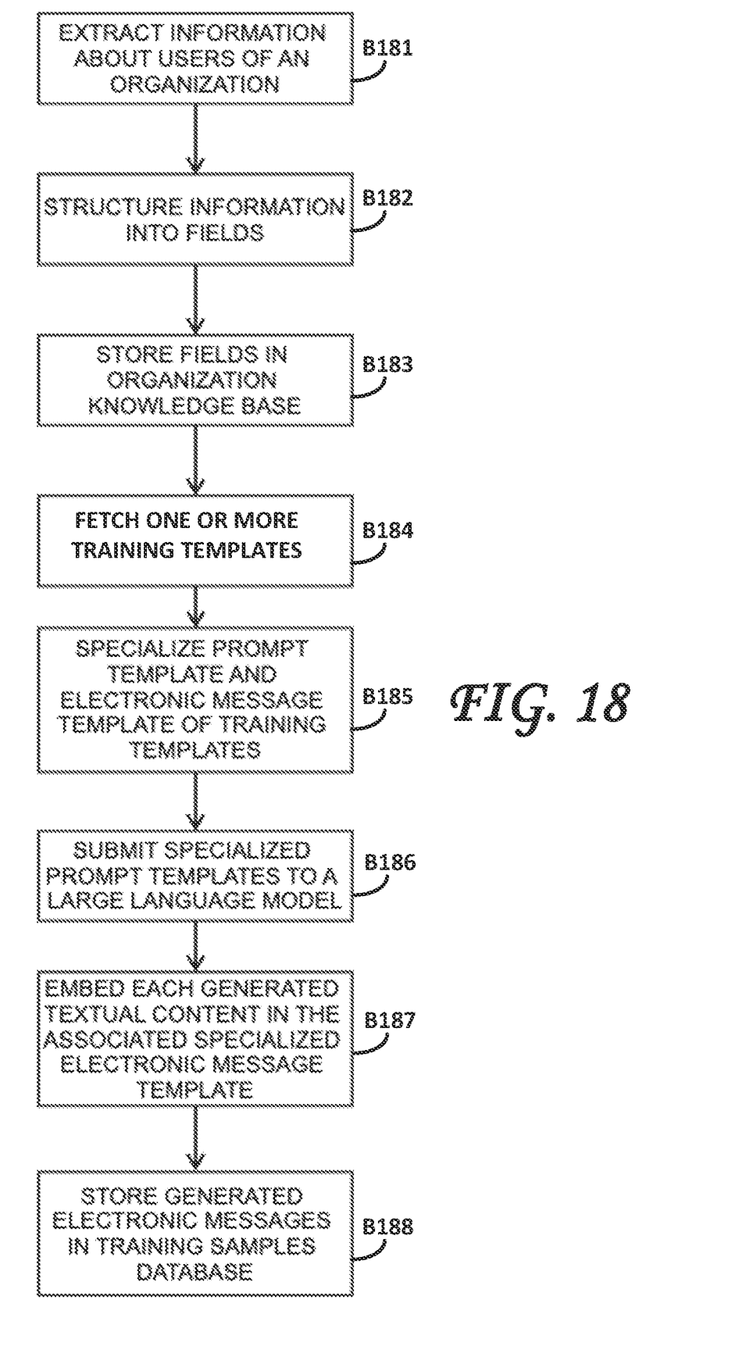
FIG. 18 is a flowchart of a computer-implemented method for generating and storing electronic messages that comprise training samples, according to an embodiment.

FIG. 18 is a flowchart of a computer-implemented method for generating and storing electronic messages that comprise training samples, according to an embodiment. Such a computer-implemented method may be carried out, according to an embodiment, by a security awareness training samples generator 202 in whole or in part. That is, one or more of the steps outlined herein may be performed by the security awareness training samples generator 202 and/or some of the steps shown in FIG. 18 may be performed by some other entity and provided over a computer network to the security awareness training samples generator 202. As shown at B181, information about a user of an organization may be extracted or otherwise provided to the security awareness training samples generator 202. For example, embodiments may be deployed in a cloud-based productivity suite environment 204, such as Microsoft 365 or Google Workspace and the step of extracting information may comprise initiating communications with the cloud-based productivity suite 204 to retrieve information about the organization and its users. Embodiments may also communicate with an identity and access management (IAM) service (such as Azure Active Directory) or a human resource management system (HRMS) service (such as PeopleSoft) to retrieve information about the organization and its users. Instead of the security awareness training samples generator 202 extracting the information about the users of the organization, that information may be formatted and provided to the security awareness training samples generator 202—in a file, for example. The extracted and/or provided information may then be parsed and structured into respective fields, as shown at B182. These structured fields may then be used to populate an organization knowledge base 206, as shown at B183. The organization knowledge base 206 may be local to the security awareness training samples generator 202 or remote therefrom and accessed over a computer network. As shown at B184, according to one embodiment, one or more training templates may then be fetched from, for example, a training templates database, as shown at 208 in FIG. 2. The training templates database 208 also may be local to the security awareness training samples generator 202 or remote therefrom and accessed over a computer network.

Recall that each training template 602 in the training templates database 208 may include a large language model prompt template 604 and an electronic message template 606. At B185, both the prompt template 604 and the electronic message template 606 of each of the fetched training templates 602 may be specialized, as shown at S604 and S606, respectively. As used herein, the term 'specialized' is intended to encompass personalizing or otherwise modifying the templates 604, 606 with the specific information accessed from the organization knowledge base 206, as shown in FIG. 13, evaluating variables, and replacing placeholders with real world, personal information that renders the resulting electronic message relevant and credible to its intended recipient. That is, fields within each of the prompt template 604 and the electronic message template 606 may be populated with the corresponding data stored in the organization knowledge base 206. This process is shown and described relative to FIGS. 13 and 14. The specialized prompt template S604 may then be submitted, as shown at B186 in FIG. 18, to a large language model-based artificial intelligence engine 210 or to some other AI algorithm that uses deep learning techniques and massively large data sets to understand, summarize, generate, and predict new content. As shown at B187, the response by the large language model to the submission of the specialized prompt template S604, shown at FIG. 16, may then be joined with the associated specialized electronic message template S606 to generate a training sample which, in the example developed herein, is the CEO fraud email (it being understood that other types of fraud electronic messages are possible) shown in FIG. 17. As shown, the generated electronic message (in this case, a CEO fraud email shown FIG. 17) includes both the specialized electronic message template S606 as well as the text 162 generated by the large language model 210 responsive to receipt of the specialized prompt template S604 and received by the security awareness training samples generator 202. The generated electronic message or messages or training samples (an exemplar of which is shown in FIG. 17) may then be stored in the training samples database 212, as shown at B188.

The generated electronic messages or training samples stored in the training samples database 212 may then be used for training purposes, providing a source of readily usable, convincing fake electronic messages that are tailored to the enterprise, to a specific recipient within the enterprise's org chart or to a specific role within the organization. These electronic messages or training samples may then be used to train and sensitize the organization's personnel to more effectively recognize fraudulent electronic messages, even when such have been personalized through clever social engineering efforts and imbued with a false sense of urgency (see "can you please take care of this asap?" in the generated electronic message of FIG. 17).

As shown in FIG. 19, the training samples may then be used to educate the user (in this case, a William Smith) against, in this example, the specific risk of CEO fraud. As shown in FIG. 19, William Smith may be invited to view and evaluate this training sample and to provide feedback by clicking the 'Legitimate' or 'Suspicious' buttons, depending upon whether William Smith believes the training sample to be a legitimate request from the company's CEO John Doe or whether the training sample is an example of a CEO fraud email seeking to induce William Smith to send money to an illegitimate recipient.

If the user clicks on the 'Legitimate' button-which indicates that the user has failed to identify the email as suspicious-then an explanation may be provided to the user, as illustrated in FIG. 20. This explanation may help the user hone his or her fraud radar and reduce the likelihood that he or she will be induced into action under false pretenses upon receipt of a true fraudulent email in the wild.

Similar methods may be used to generate training samples configured as instant messages, text messages, or platform-specific messages such as communication or collaboration applications Slack® or Microsoft Teams® and the like. Other security awareness training methods may be used to educate the user. For instance, the CEO fraud training sample may be sent directly to the user inbox, without informing the recipient that the received email constitutes part of a training exercise. If the user fails to identify the email as suspicious and does not carry out the expected action (such as reporting the email to an administrator of the organization), then an explanation similar to that shown in FIG. 20 may be provided to educate the user against the risk of CEO fraud and similar scams.

Physical Hardware

Figure 21:
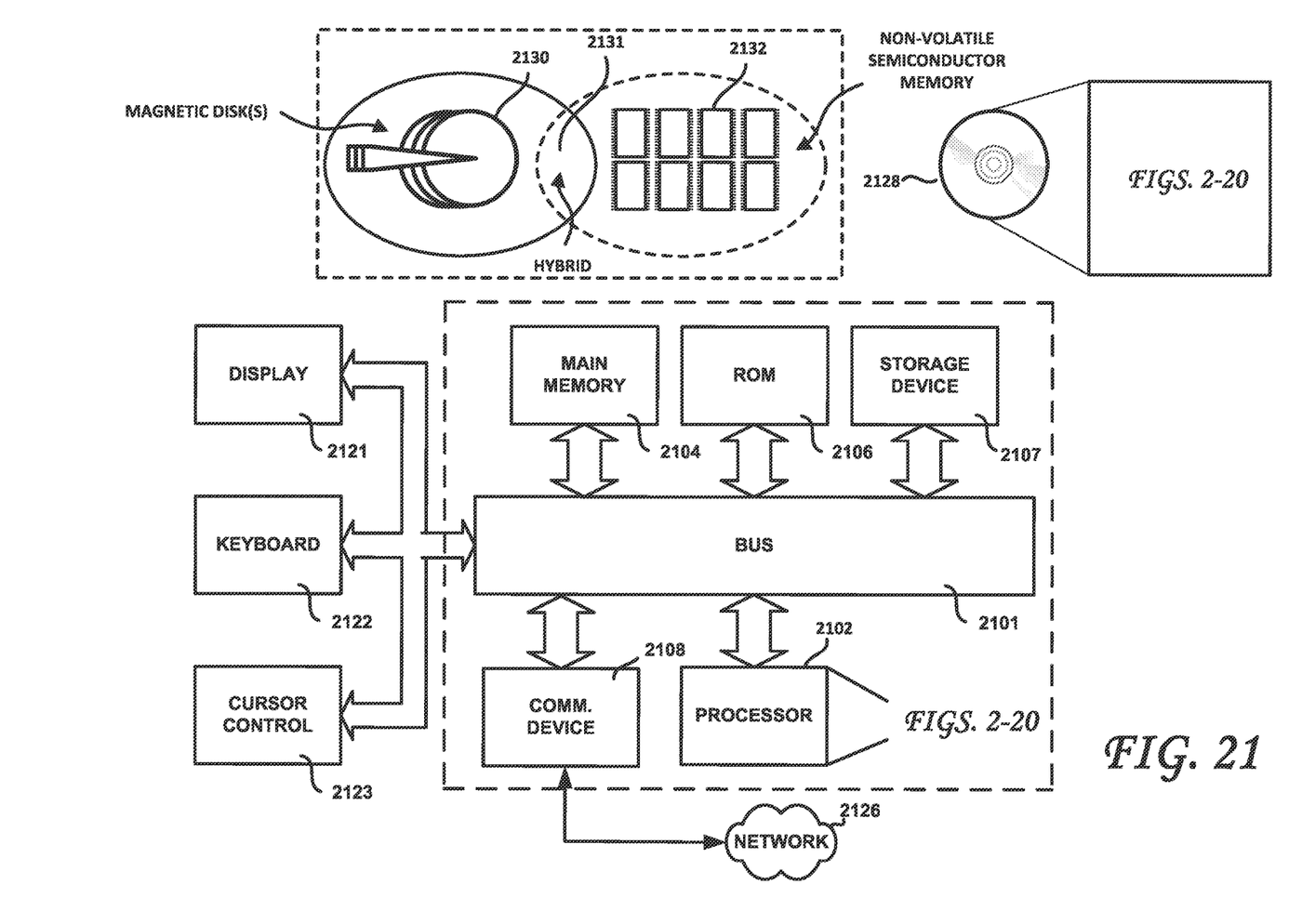
FIG. 21 is a block diagram of a computing device suitable for carrying out a computer-implemented method of generating security awareness training samples according to an embodiment and a computing device configured according to an embodiment.

FIG. 21 illustrates a block diagram of a computing device with which embodiments may be implemented. The computing device of FIG. 21 may include a bus 2101 or other communication mechanism for communicating information, and one or more processors 2102 coupled with bus 2101 for processing information. The computing device may further comprise a random-access memory (RAM) or other dynamic storage device 2104 (referred to as main memory), coupled to bus 2101 for storing information and instructions to be executed by processor(s) 2102. Main memory (tangible and non-transitory, which terms, herein, exclude signals per se and waveforms) 2104 also may be used for storing temporary variables or other intermediate information during execution of instructions by processor 2102. The computing device of FIG. 21 may also include a read only memory (ROM) and/or other static storage device 2106 coupled to bus 2101 for storing static information and instructions for processor(s) 2102. A data storage device 2107, such as a magnetic disk and/or solid-state data storage device may be coupled to bus 2101 for storing information and instructions-such as would be required to carry out the functionality shown and disclosed relative to FIGS. 2-20. The computing device may also be coupled via the bus 2101 to a display device 2121 for displaying information to a computer user. An alphanumeric input device 2122, including alphanumeric and other keys, may be coupled to bus 2101 for communicating information and command selections to processor(s) 2102. Another type of user input device is cursor control 2123, such as a mouse, a trackball, or cursor direction keys for communicating direction information and command selections to processor(s) 2102 and for controlling cursor movement on display 2121. The computing device of FIG. 21 may be coupled, via a communication interface (e.g., modem, network interface card or NIC) 2108 to the network 2126.

As shown, the storage device 2107 may include direct access data storage devices such as magnetic disks 2130, non-volatile semiconductor memories (EEPROM, Flash, etc.) 2132, a hybrid data storage device comprising both magnetic disks and non-volatile semiconductor memories, as suggested at 2131. References 2104, 2106 and 2107 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over network 2126. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 2128. For example, reference 2128 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 2128 may be embodied as an encrypted solid-state drive. Other implementations are possible.

Embodiments of the present inventions are related to the use of computing devices for generating security awareness training samples with large language models, as shown and described herein. According to one embodiment, the methods, devices and systems described herein may be provided by one or more computing devices in response to processor(s) 2102 executing sequences of instructions, embodying aspects of the computer-implemented methods shown and described herein, contained in memory 2104. Such instructions may be read into memory 2104 from another computer-readable medium, such as data storage device 2107 or another (optical, magnetic, etc.) data carrier, such as shown at 2128 which may store executable code configured to enable the functionality described and shown relative to FIGS. 2-20 and to take actions discussed relative to FIG. 18. Execution of the sequences of instructions contained in memory 2104 causes processor(s) 2102 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor or integrated with the microprocessor. In another embodiment, the instructions may be stored on a disk and read into a volatile semiconductor memory before execution by the microprocessor.

One embodiment is a computer-implemented method of generating security awareness training samples, the computer-implemented method comprising receiving, structuring and storing information about a user of an organization into an organization knowledge base; selecting and fetching at least one training template, each training template comprising an electronic message template and a prompt template for a large language model; specializing the prompt template and the electronic message template of each selected and fetched training template using the information about users of the organization stored in the organization knowledge base; submitting the specialized prompt template of each selected and fetched training template to the large language model; receiving a textual content generated by the large language model responsive to each submitted specialized prompt template; and generating a security awareness training sample for each submitted specialized prompt template using the corresponding generated textual content received from the large language model and the corresponding specialized at least one electronic message template.

According to further embodiments, the computer-implemented method may further include storing each generated security awareness training sample in a training samples database. The large language model may be, for example, GPT-X, OPT-XXX, BLOOM, PaLM or LLaMA-XXX, where X is a number or a letter. Other AI systems may also be used. The information may be received, over a computer network, from an identity and access management (IAM) service and/or a human resource management System (HRMS) service. Other sources of user information may be accessed and used. For example, the information may be received, over a computer network, from a cloud-based productivity suite such as, for example, Microsoft 365 or Google Workspace. In one embodiment, the information may be received from the cloud-based productivity suite over a computer network via an API (Application Programming Interface). The information received may include the user's given name, surname, email address, role of the user within the organization, a manager of the user, personal information of direct reports to the user, a department to which the user belongs and/or a list of people that communicate and/or collaborate frequently with the user. Other types of information may be used instead of or in addition to those listed immediately above. For example, in some embodiments, the information may include one or more emails or other forms of electronic messages composed by or attributed to the user.

Structuring, according to an embodiment, may include structuring the information received into a plurality of fields. The scope of any of the plurality of fields may include, for example, the organization and/or a specific user within the organization. The type of the plurality of fields may include a string, a Boolean value or textual content.

The electronic message template, according to one embodiment, is an electronic template for email, an instant message, a text message or an electronic message configured for a communication or collaboration application ("app").

According to some embodiments, selecting the training template(s) may include evaluating a combination of criteria, such as matching of a field with a predetermined condition. Specializing the prompt template and the electronic message template, according to some embodiments, may include replacing at least some of placeholders and variables within the prompt template and the electronic message template with data and values from the user information stored in the organization knowledge base. To increase diversity and credibility of the training samples, some values may be generated at runtime.

The computer-implemented method may include discarding the training template and not generating the corresponding security awareness training sample when one or more fields required for the specialization of the prompt template, or the specialization of the electronic message template is missing or is empty. Submitting the specialized prompt templates to the large language model may be carried out sequentially or in parallel. The large language model may be deployed locally or may be accessed remotely over a computer network.

Another embodiment is a computing device comprising at least one processor; at least one data storage device coupled to the at least one processor; a network interface coupled to the at least one processor and to a computer network, and a plurality of processes spawned by the at least one processor to generate security awareness training samples. The processes may be processing logic for receiving, structuring and storing information about a user of an organization into an organization knowledge base; selecting and fetching at least one training template, the training template(s) comprising an electronic message template and a prompt template for a large language model and specializing the prompt template(s) and the electronic message template(s) of the fetched training template(s) using the information about users of the organization stored in the organization knowledge base. The specialized prompt template(s) may then be submitted to the large language model and textual content generated by the large language model may then be received, responsive to each submitted specialized prompt template. A security awareness training sample may then be generated for each submitted specialized prompt template using the corresponding generated textual content received from the large language model and the corresponding specialized at least one electronic message template.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by enabling the generation of security awareness training samples with large language models. Such computer-implemented methods also improve email and electronic messaging systems by providing an unlimited number of realistic training exemplars, such that users thereof will become more adept at recognizing fraud. Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain embodiments of the disclosure have been described, these embodiments have been presented by way of example only and are not intended to limit the scope of the disclosure. Indeed, the novel methods, devices and systems described herein may be embodied in a variety of other forms. Furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of generating security awareness training samples, the computer-implemented method comprising:
   receiving, structuring and storing information about a user of an organization into an organization knowledge base;
   selecting and fetching at least one training template, each training template comprising an electronic message template and a prompt template for a large language model;
   specializing the prompt template and the electronic message template of each selected and fetched training template using the information about users of the organization stored in the organization knowledge base;
   submitting the specialized prompt template of each selected and fetched training template to the large language model over a computer network;
   receiving textual content generated by the large language model responsive to each submitted specialized prompt template; and
   generating a security awareness training sample for each submitted specialized prompt template using the corresponding generated textual content received from the large language model and the corresponding specialized at least one electronic message template;
   generating an electronic message comprising the security awareness training sample and sending the generated electronic message to a recipient over the network;
   receiving a response to the electronic message from the recipient over the network, and evaluating the response to determine whether the recipient identified the generated electronic message as a legitimate electronic message or a suspicious electronic message.

2. A computer-implemented method of claim 1, further comprising storing each generated security awareness training sample in a training samples database.

3. The computer-implemented method of claim 1, wherein the large language model is one of GPT-X, OPT-XXX, BLOOM, PaLM and LLaMA-XXX, where X is one of a number and a letter.

4. The computer-implemented method of claim 1, wherein the information is received, over the computer network, from one of an identity and access management (IAM) service and a human resource management system (HRMS) service.

5. The computer-implemented method of claim 1, wherein the information is received from a cloud-based productivity suite over the computer network.

6. The computer-implemented method of claim 5, wherein the cloud-based productivity suite includes one of Microsoft 365 and Google Workspace.

7. The computer-implemented method of claim 5, wherein the information is received from the cloud-based productivity suite over the computer network via an API (Application Programming Interface).

8. The computer-implemented method of claim 1, wherein the information received includes at least one of the user's given name, surname, email address, role of the user within the organization, a manager of the user, personal information of direct reports to the user, a department to which the user belongs and a list of people that communicate and/or collaborate frequently with the user.

9. The computer-implemented method of claim 1, wherein the information received includes at least one email composed by the user.

10. The computer-implemented method of claim 1, wherein structuring includes structuring the information received into a plurality of fields.

11. The computer-implemented method of claim 10, wherein a scope of any of the plurality of fields is one of the organization and a specific user within the organization.

12. The computer-implemented method of claim 10, wherein a type of each of the plurality of fields is one of a string, a Boolean value and textual content.

13. The computer-implemented method of claim 1, wherein the electronic message template is a template for one of an email, an instant message, a text message and an electronic message configured for a communication or collaboration application.

14. The computer-implemented method of claim 1, wherein selecting at least one training template includes evaluating a combination of criteria.

15. The computer-implemented method of claim 1, wherein selecting at least one training template criteria includes matching of a field with a predetermined condition.

16. The computer-implemented method of claim 1, wherein specializing the prompt template and the electronic message template includes replacing at least some of placeholders and variables within the prompt template and the electronic message template with content and values from the information about users of the organization stored in the organization knowledge base.

17. The computer-implemented method of claim 16, further comprising generating at least some of the values at runtime.

18. The computer-implemented method of claim 1, further comprising discarding the training template and not generating the corresponding security awareness training sample when one or more fields required for the specialization of the prompt template, or the specialization of the electronic message template is missing or is empty.

19. The computer-implemented method of claim 1, wherein submitting the at least one specialized prompt template to the large language model is carried out one of sequentially and in parallel.

20. The computer-implemented method of claim 1, wherein the large language model is one of deployed locally and accessed remotely over the computer network.

21. A computing device comprising:
at least one processor;
at least one data storage device coupled to the at least one processor;
a network interface coupled to the at least one processor and to a computer network;
a plurality of processes spawned by the at least one processor to generate security awareness training samples, the processes including processing logic for:
receiving, structuring and storing information about a user of an organization into an organization knowledge base;
fetching at least one training template, the at least one training template comprising an electronic message template and a prompt template for a large language model;
specializing the at least one prompt template and the at least one electronic message template of the fetched at least one training template using the information about users of the organization stored in the organization knowledge base;
submitting the at least one specialized prompt template to the large language model over the computer network using the network interface;
receiving a textual content generated by the large language model responsive to each submitted specialized prompt template;
generating a security awareness training sample for each submitted specialized prompt template using the corresponding generated textual content received from the large language model and the corresponding specialized at least one electronic message template;
generating an electronic message comprising the security awareness training sample and sending the generated electronic message to a recipient;
receiving a response to the electronic message from the recipient, and
evaluating the response to determine whether the recipient identified the generated electronic message as a legitimate electronic message or a suspicious electronic message.

* * * * *